US008068483B2

(12) United States Patent
Xu

(10) Patent No.: US 8,068,483 B2
(45) Date of Patent: Nov. 29, 2011

(54) METHOD FOR MIGRATION BETWEEN A PERMANENT CONNECTION AND A SWITCHED CONNECTION IN A TRANSMISSION NETWORK

(75) Inventor: Yongliang Xu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1252 days.

(21) Appl. No.: 10/566,602

(22) PCT Filed: Apr. 8, 2004

(86) PCT No.: PCT/CN2004/000325
§ 371 (c)(1),
(2), (4) Date: Aug. 7, 2006

(87) PCT Pub. No.: WO2005/011302
PCT Pub. Date: Feb. 3, 2005

(65) Prior Publication Data
US 2006/0268944 A1 Nov. 30, 2006

(30) Foreign Application Priority Data
Jul. 31, 2003 (CN) .................................. 03 1 49955

(51) Int. Cl.
*H04L 12/28* (2006.01)
(52) U.S. Cl. ......................................................... 370/389
(58) Field of Classification Search .................. 370/352, 370/353, 354, 401, 356, 338, 389, 331
See application file for complete search history.

(56) References Cited

U.S. PATENT DOCUMENTS

| | | | | |
|---|---|---|---|---|
| 5,761,193 A * | 6/1998 | Derango et al. | ............... | 370/312 |
| 6,721,413 B1 * | 4/2004 | Kawakami | ..................... | 379/219 |
| 6,775,288 B1 * | 8/2004 | Tooker et al. | ............... | 370/395.2 |
| 6,822,962 B1 * | 11/2004 | Noake et al. | ................ | 370/395.2 |
| 7,093,160 B2 * | 8/2006 | Lau et al. | ........................ | 714/11 |
| 2001/0033561 A1 * | 10/2001 | Rodin | ............................ | 370/338 |
| 2003/0035391 A1 * | 2/2003 | Shobatake | ..................... | 370/331 |

(Continued)

FOREIGN PATENT DOCUMENTS

| | | |
|---|---|---|
| CN | 1384618 | 12/2002 |
| JP | 2003115871 A | 4/2003 |
| JP | 2003-134154 | 5/2003 |
| JP | 2003204351 | 7/2003 |
| WO | 01/10083 | 2/2001 |

OTHER PUBLICATIONS

Lehr, G. et al: "Design of a Network Level Management Information Model for Automatically Switched Transport Networks"; 2002 IEEE/IFIP Network Operations and Management Symposium, Apr. 15, 2002, pp. 111-124, XP 001176044, ISBN: 0-7803-7382-0, p. 112, last paragraph to p. 114, line 13.

(Continued)

*Primary Examiner* — Robert Wilson
(74) *Attorney, Agent, or Firm* — Conley Rose, P.C.; Grant Rodolph

(57) ABSTRACT

This invention discloses a method for migration between a permanent connection and a switched connection in a transmission network. The method comprises the steps of: the ingress node of the current connection receiving a message of connection migrating request; forwarding the message of connection migrating request node by node starting from the ingress node in the direction of the traffic signal transmission of the current connection till the egress node of the current connection; making migration between the two connection modes until the ingress node after the message of migrating request has been received. By making migration between modes of connection node by node at each node of a transmission network, this invention ensures a smooth transition between a permanent connection and a switched connection, effectively avoiding service disruption while making the implementation of network services more flexible.

34 Claims, 3 Drawing Sheets

U.S. PATENT DOCUMENTS

| | | | | |
|---|---|---|---|---|
| 2003/0169729 | A1* | 9/2003 | Bienn et al. | 370/353 |
| 2003/0175029 | A1* | 9/2003 | Harney et al. | 398/83 |
| 2004/0146147 | A1* | 7/2004 | Picard et al. | 379/88.22 |
| 2005/0083862 | A1* | 4/2005 | Kongalath | 370/299 |
| 2006/0256795 | A1* | 11/2006 | Basso et al. | 370/395.1 |
| 2006/0268944 | A1* | 11/2006 | Xu | 370/903 |

OTHER PUBLICATIONS

"Architecture for the Automatic Switched Optical Networks (ASON)" Nov. 29, 2001, ITU-T 6 8080/Y.1304, XP017401032, p. 4 to p. 6, figure 1.

* cited by examiner

METHOD FOR MIGRATION BETWEEN A PERMANENT CONNECTION AND A SWITCHED CONNECTION IN A TRANSMISSION NETWORK

CROSS-REFERENCE TO RELATED APPLICATIONS

This application claims priority to Patent Cooperation Treaty (PCT) Application No. PCT/CN2004/000325 filed Apr. 8, 2004, entitled, A METHOD OF TRANSFORMATION BETWEEN PERMANENT CONNECTION AND SWITCHED CONNECTION IN OPTICAL NETWORK, which claims priority to Chinese Patent Application Serial No. 03149955.4 filed Jul. 31, 2003, all of the disclosure of which is hereby incorporated by reference in its entirety.

FIELD OF THE TECHNOLOGY

This invention relates to the migration between a permanent connection and a switched connection in a transmission network, more particularly, to a method for implementing a migration between a permanent connection and a switched connection in a transmission network without service disruption.

BACKGROUND OF THE INVENTION

Optical networks include Synchronous Digital Hierarchy (SDH)/Synchronous optical networks (Sonet), wave-length switched networks, and etc. A traditional optical network is a system based on centralized management and connection services between nodes of the network are implemented by way of permanent connection. The path of connection is pre-calculated by the management plane based on the connection requirement and the availability of network resources, then cross-connection commands are sent to nodes on the connection path via Network Management Interface-Transport (NMI-T) to carry out unified designation and assignment, and eventually, accomplish the establishment of a communication channel. The approach of permanent connection had good effects in the early development of optical network because the design is simple and cost is low. However, the setup, maintenance, and release of optical connection by the approach of permanent connection require the involvement of human work or network management system. With the continuing growth of traffic data, this approach of connection is no longer able to meet the dynamic and flexible requirement of an optical network system.

The key to solve this problem is the implementation of dynamic optical switching. That is why ITU-T has put forward the architecture of Automatic Switching Optical Network (ASON), which adds a control plane to a traditional optical network and puts forward the concept of switched connection. According to this idea, a node in an optical network will first obtain the link connection relations of this node with other nodes by the link discovery technique, then issue the states of node and links through the control plane, and receive the state issuance of other nodes in the network. Eventually, every optical node will have a "network map" giving a description of the accurate topology of the network and including various information about nodes, links, and resources. When a node is requested by a client or management system to establish a connection, the node will first calculate a path using the information of the "network map" combined with a certain algorithm of routing, and then drive the nodes on the path by signaling protocols to establish the cross-connection. When a network connection is dynamically created or released, or a failure brings about changes in the resources of links, related nodes will issue in time updated states of node and links to achieve re-synchronization of the "network map". In ASON, if the connection request received by a node comes from a client device or proxy, the connection created is referred to as switched connection; if the request comes from network management system, the connection created is referred to as soft permanent connection. In this specification, switched connection and soft permanent connection are both referred to as switched connection except otherwise specified. If a switched connection or a soft permanent connection is cut off when a failure occurs in the network, e.g. a link disconnects or a node fails, the control plane will be able to re-create the routing of connection dynamically and restore the traffic. An optical network with this approach of switched connection is of dynamic and flexible characteristics and is capable of meeting the requirement of growing data traffic.

Though the approach of switched connection has many advantages, it is a long process of evolution to upgrade a traditional supply-based optical network into an ASON, for it is an enormous project of system engineering involving the upgrading of network equipment, network management system, operating and supporting systems as well as other aspects of the network. In the present process of transition, the control plane is implemented only on some nodes. Even on these "intelligent" nodes where the control plane has been implemented, manually provided connections will not disappear immediately and permanent connections and switched connections will co-exist in the network. When permanent connections and switched connections co-exist in a network, network resources are usually allocated by the management plane to the connections, respectively and it is not easy to change the allocation thereafter. However, it is often not possible for the static allocation of resources to satisfy the changing traffic of an optical network. It is often necessary for an operator to make migration between a permanent connection and a switched connection to re-allocate the resources occupied respectively by the two modes of connection and make use of the different characteristics thereof.

In the prior art, however, no method of migration between a permanent connection and a switched connection is provided. When it is needed to make such a migration, the migrated connection has to be released at first, and then a connection of the required mode can be created using the resources from the released connection. This approach of migration may cause a disruption of the traffic, damages to the data in network transmission, problems to the operation of service, as well as inconvenience for the operator, and may further affect the network evolution to ASON.

SUMMARY OF THE INVENTION

In view of the above, the present invention provides a method of migration between a permanent connection and a switched connection in a transmission network so as to implement a migration between the permanent connection and the switched connection without interruption of the traffic, make the process of migration safe and convenient, and promote the ASON technology.

According to this invention, the method of migration between a permanent connection and a switched connection in a transmission network comprises the steps of:

a) the ingress node of the current connection forwarding the message of connection migration request node by node in the direction of traffic signal transmission of the current connection starting from the ingress node until the egress node of the current connection, after receiving a message of connection migrating request; and b) making migration between a permanent connection and a switched connection node by node after receiving the message of migrating request.

Said step of forwarding the message of connection migrating request and the process of connection migration in this method is performed by the control plane of a node and the message of connection migrating request is transferred via the control links.

Migrating a permanent connection to a switched connection in said migration between a permanent connection and a switched connection with this method comprises creating a state of switched connection on the control plane of a node and handing over the cross connections of the permanent connection at the node to the control plane.

Migrating a switched connection to a permanent connection in said migration between a permanent connection and a switched connection with this method comprises deleting the current state of switched connection from the control plane of said node and handing over the cross connections of said switched connection at the node to the management plane.

Said control plane in this method is based on TCP/IP protocol; said migration between a permanent connection and a switched connection is implemented by using the signaling protocol of resource reservation protocol with traffic engineering extension (RSVP-TE) or signaling protocol of constraint-based routing label distribution protocol (CR-LDP).

Said migration between a permanent connection and a switched connection node by node in Step b) of the method comprises: making migration between a permanent connection and a switched connection node by node starting from the egress node until the ingress node in the reversed direction of the forwarding path of the message of connection migrating request after the message of connection migrating request has reached the egress node.

The method further comprises: each said node, after completing the migration, sending a message of migration completing notification to the next node required to make migration until the ingress node, which sends said message of migration completing notification to the initiator of the connection migrating request.

Said migration between a permanent connection and a switched connection node by node in Step b) of the method comprises: each node making a migration between a permanent connection and a switched connection right after a message of connection migrating request is received.

The method further comprises: after all said nodes complete the migration, forwarding the message of migration completing notification node by node starting from the egress node till the ingress node in the reversed direction of the forwarding path of said message of request, and the ingress node sending said message of migration completing notification to the initiator of the connection migrating request.

Said message of migration completing notification contains the routing information of the entire connecting link of the migration.

Said message of migration completing notification contains the identifier of the current switched connection if said migration between a permanent connection and a switched connection is a migration from a switched connection to a permanent connection.

Said message of connection migrating request received by the ingress node comprises: the ingress node identifier and incoming port information or the ingress node identifier and outgoing port information of the ingress node of the connection currently requested to be migrated, and each node adds its own outgoing port information to the message of connection migrating request before forwarding the message.

In the process of forwarding said message of connection migrating request by each node, the outgoing port information from the present node to the next node is added to the message of connection migrating request if the message includes incoming port information; and the incoming port information from the present node to the next node is added to the message of connection migrating request if the message includes outgoing port information.

Said incoming port information comprises the identifier of the incoming port, or the identifier of the incoming channel, or the combination thereof; and said outgoing port information comprises the identifier of the outgoing port, or the identifier of the outgoing channel, or the combination thereof.

Said own outgoing port information of the node is obtained by inquiring the cross-connection information stored in the node itself based on the incoming port information of the current node.

The method further comprises before said ingress node makes a migration between a permanent connection and a switched connection: deciding whether the ingress node identifier and incoming port information or the ingress node identifier and outgoing port information contained in the received message of connection migrating request is correct or not, if yes, making the migration, otherwise returning a message of failure and ending this process.

Said message of connection migrating request received by the ingress node further comprises: the egress node identifier, or the egress node identifier and outgoing port information at the egress node of the current connection requested to be migrated.

The method further comprises before said egress node makes a migration between a permanent connection and a switched connection: deciding whether the egress node identifier or the egress node identifier and outgoing port information contained in the received message of connection migrating request is correct or not, if yes, creating or deleting a switched connection at the node, otherwise returning a message of failure and ending this process.

If said migration between a permanent connection and a switched connection is a migration from a switched connection to a permanent connection, the message of connection migrating request received by said ingress node comprises: the identifier of the current switched connection.

Said connection in the method is a uni-directional connection or a bi-directional connection.

Said switched connection in the method is a soft permanent connection initiated by network management system or a switched connection initiated by a client device or a proxy thereof.

Said transmission network is a Synchronous Digital Hierarchy, or a synchronous optical network, or a wavelength switched network, or an Optical Transport Network (OTN).

It can be seen from the above solution that, according to this invention, a smooth transition between a permanent connection and a switched connection is realized by making the migration node by node at each relevant node in a transmission network, effectively avoiding transmission damages to service terminals and traffic data while making the implementation of network services more flexible.

EMBODIMENTS OF THE INVENTION

This invention is hereinafter described in detail with reference to the accompanying drawings.

This invention is applicable to optical networks like SDH/Sonet wavelength switched networks, and Optical Transport Network (OTN), in which there are a plurality of nodes and links connecting the nodes. The network nodes required to make migration of connection mode have three planes: the transmission plane, the control plane, and the management plane. The control plane controls the transmission plane and supports the creation of a switched connection. The management plane manages the control plane and the transmission plane and supports the creation of a permanent connection.

Figure 1:
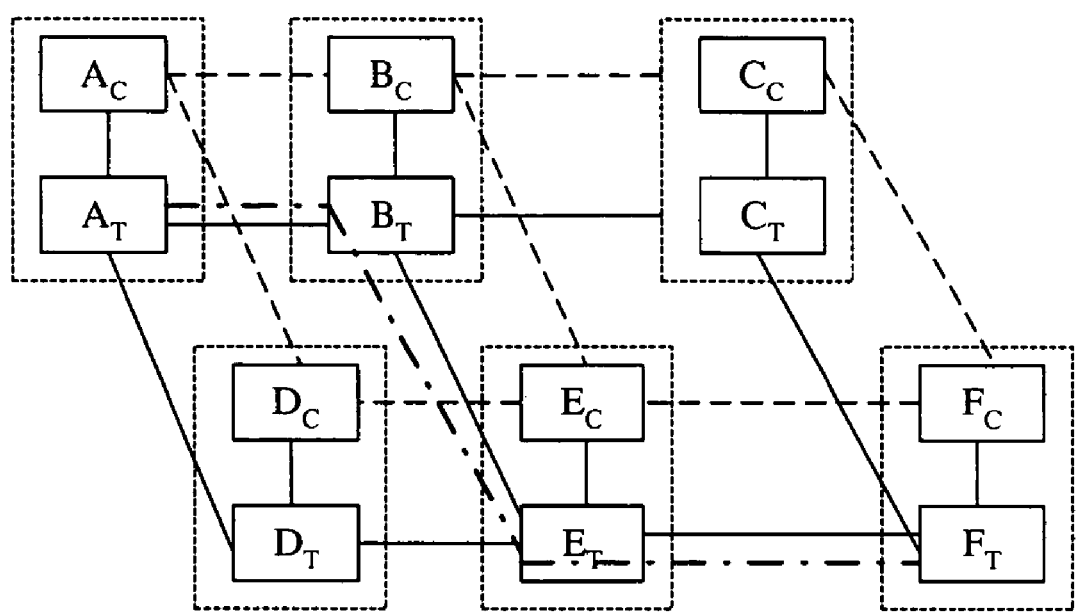
FIG. 1 is a schematic diagram illustrating the optical network with control planes and the network connections in an exemplary embodiment of this invention.

The solution of this invention is described below with reference to an example as shown in FIG. 1. The optical network as shown in FIG. 1 comprises six nodes: Node A-Node F, and each of the nodes has a transmission plane AT-FT and a control plane AC-FC, respectively, where the transmission plane and the control plane can be physically separated or physically combined but logically separated. Each node also contains the management plane, which makes the transmission plane and control plane manageable by the network management system. In order to make it clear, the management planes are not shown in FIG. 1. The nodes are connected by optical links, which are shown in FIG. 1 with straight lines. The actual control planes of nodes communicate with each other via control links, which are shown in FIG. 1 with dotted lines. The channels of the control links are logical and can be specifically implemented in various ways, for example, using the overhead bytes in SDH/Sonet. Normal connections of optical links have been established between each node of the optical network here and the control planes have established normal session with adjacent nodes via the control channels. By way of link management protocol, each node obtains its connections of optical links with neighboring nodes and the connections of the neighboring nodes with optical links spread through a link state based routing protocol, creating eventually at each node a consistent "network map", which includes all the network nodes, the connection of links between them and the information about link resources. In addition, there is a table of cross-connections at each node, which records the connections of each port and channel at this node. Moreover, there has created in the network a connection of A-B-E-F, which is shown in FIG. 1 with a dot-dash line. In this network, said control plane is usually based on TCP/IP protocol and a migration between a permanent connection and a switched connection is implemented by using the RSVP-TE signaling protocol or CR-LDP signaling protocol.

Figure 2:
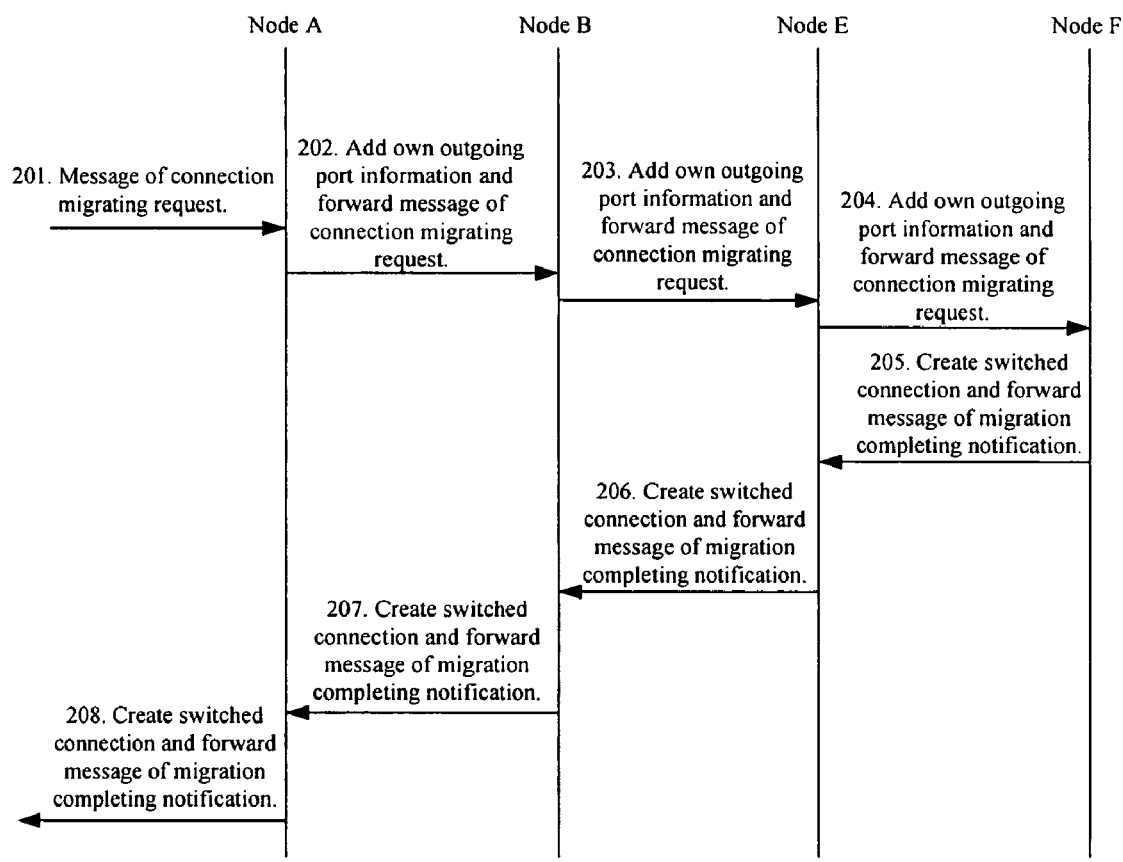
FIG. 2 is a flow chart illustrating the migration from a permanent connection to a switched connection.

When the created connection of A-B-E-F in FIG. 1 is a permanent connection and needs to be migrated to a switched connection, the process of migration is shown as FIG. 2, comprising the steps of:

Step 201: The network management system, in the case of soft permanent connection, or the client device, in the case of switched connection, sends to the ingress node, Node A, a message of connection migrating request for migrating the permanent connection of A-B-E-F into a switched connection.

The message mentioned in this specification is usually a command if sent from the network management system while it is usually a signaling if sent from a client device.

Said message of connection migrating request contains a list of routing records. If the current permanent connection A-B-E-F to be migrated starts from the incoming port or incoming channel of the ingress node A and ends at the outgoing port or outgoing channel of the egress node F, the list of routing records in the message of connection migrating request should comprise at least: ID of the ingress node and the incoming port information thereof; if the current permanent connection A-B-E-F to be migrated starts from the ingress node A and ends at the egress node F, the list of routing records in the message of connection migrating request should comprise at least: ID of the ingress node and the outgoing port information thereof. The incoming port information mentioned here is the ID of the incoming port of the node, and if the permanent connection to be migrated includes a certain channel where the port is, the incoming port information should also include the ID of the incoming channel where the incoming port is. The outgoing port information is the ID of the outgoing port, and if the permanent connection to be migrated includes a certain channel of the port, the outgoing port information should also include the ID of the channel of the outgoing port. The identifier of all the network devices in this exemplary embodiment is represented by ID of network devices. In addition, said list may also comprise: the direction information of the current connection, i.e. bi-directional or uni-directional, the payload type of the connection, and so on. Furthermore, in order to make it convenient for the egress node to verify the message of connection migrating request at the subsequent Step 205, ID of the egress node may be added to the message of request; and if the current permanent connection to be migrated starts from the incoming port or incoming channel of the ingress node A and ends at the outgoing port or outgoing channel of the egress node F, the outgoing port information of the egress node should be included in the message as well.

Step 202: After the ingress node A receives from its incoming port the message of connection migrating request sent at Step 201, if the message of request contains the incoming port ID of the ingress node and the incoming port information of the ingress node, obtain the outgoing port information at node A of the current permanent connection requested to be migrated through the above information together with the cross-connection information stored in A's own table of cross-connection, and add the outgoing port information to the message of request; if the message of connection migrating request contains outgoing port information, add the outgoing port information directly to the list of routing records of the message of request. Then obtain the ID of the next node, i.e. node B according to the connection relationship of links, i.e. the "network map", stored in the control plane for management and maintenance of adjacent links, and send to node B the message of migrating request via the IP-based control channel.

A preferred way of performing this step may also comprises verifying the information in the message beforehand after node A receives the message of connection migrating request, which specifically comprises: checking whether the node ID of the incoming port included in the signaling exists or not, and checking whether the incoming port information exists and whether there exists the permanent connection on that channel if the message includes incoming port information; if yes, go to the follow-up sub-steps in Step 202, otherwise return a message of error to the initiator of the migrating request and end the process. In this way, interference from fault messages can be avoided.

Step 203: Node B, after receiving the message of connection migrating request sent from node A, can obtain from the message the outgoing port information of the previous node, i.e. node A. Then the relevant incoming port information at node B of the permanent connection to be migrated can be obtained according to said outgoing port information combined with the connection relationship of links stored in node B's cross-connection table for link management and maintenance. After that, go through the similar steps as with node A, that is, find the outgoing port information by means of the incoming port information and add the outgoing port information to the end of the list of routing records in the message of migrating request, then obtain the ID of the next node E and send the message of migrating request to node E via the control channel.

Step 204: Node E, after receiving the message of connection migrating request sent from node B, forwards the message to egress node F in the same way as that of node B.

Step 205: After node F receives the message of connection migrating request sent from node E, establish the requested state of switched connection on the control plane of node F, hand over the ports, channels and cross resources occupied by the connection to the control plane and generate a message of migration completing notification, which preserves all the information of the list of routing records in the message of connection migrating request and has the ID of this node added. If the message of connection migrating request includes the incoming port information of the ingress node, then the outgoing port information of the egress node, i.e. ID of the outgoing port or ID of the outgoing channel, should be added to the message of migration completing notification. In this way, the complete routing of links of the permanent connection to be migrated is included in the message of migration completing notification. Then the message of migration completing notification is transferred in the reversed direction of the transferring path of the message of connection migrating request, that is, transferred along the path of F-E-B-A.

Preferably in this step, after node F receives the message of connection migrating request sent from E, further verify whether the message is correct or not, which specifically comprises: making analysis of the ID of the egress node contained in the message, and meanwhile making analysis of the outgoing port information if the outgoing port information of the egress node is also contained in the message, comparing said information with the ID and outgoing port information of this node to determine whether they are consistent. If consistent, accept the connection migrating request and continue with the follow-up sub-steps of Step 205, otherwise return a message of error along the path of F-E-B-A to the initiator and give the cause of error, and end the process. In performing this step, the outgoing port information of node F, i.e. ID of the outgoing port or ID of the outgoing channel at node F, may be obtained in a similar way as in nodes B and E.

Step 206: after node E receives the message of migration completing notification sent from node F, similarly as at node F, establish the requested state of switched connection on the control plane thereof, hand over the cross-connections of this node as well as the resources occupied by the connection to the control plane, and forward the message of migration completing notification to node B.

Step 207: After node B receives the message of migration completing notification sent from node E, establish the switched connection in the same way as in node E before returning the message of migration completing notification to node A.

Step 208: After node A receives the message of migration completing notification sent from node B, establish in node A the switched connection in the same way as in node E and node B. If the migration succeeds, return the message of migration completing notification to the initiator of the message. At this time, the permanent connection of A-B-E-F has been migrated to a switched connection, which has the same functions as those of other switched connections, such as dynamic recovering and etc. If the migration fails, return a message of failure to the initiator of the message and end the process.

It can be seen from above that in this embodiment, the message of migrating request is forwarded node by node successively in the downstream direction of the permanent connection to be migrated, i.e. in the run of the traffic signals of the connection, while the final creation of a switched connection is completed node by node from the egress node in the upstream direction. For a bi-directional connection, any direction of the traffic signal run can be selected for making the migration.

Figure 3:
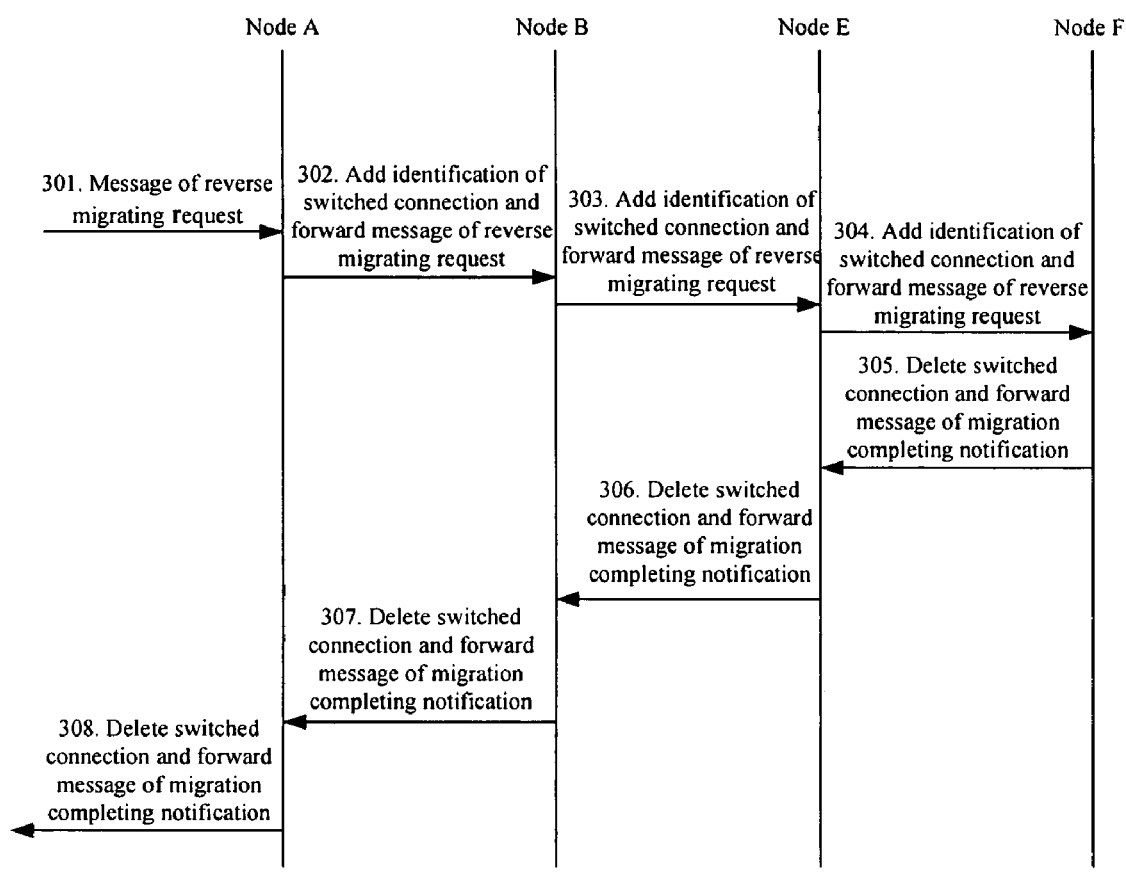
FIG. 3 is a flow chart illustrating the migration from a switched connection to a permanent connection.

Should the connection of A-B-E-F in FIG. 1 is a switched connection and it is needed to convert the switched connection of A-B-E-F into a permanent connection, the process of migration is shown as in FIG. 3, comprising the steps of:

Step 301: The network management system, in case of a soft permanent connection, or a client device, in case of a switched connection, sends to the ingress node A a message of connection migrating request for migrating a switched connection into a permanent connection. In order to differentiate from the previous process, this message is referred to as the message of reverse migrating request.

In the process of reverse migration from a switched connection to a permanent connection, as there has usually stored on the local control plane of each node the routing information of other nodes of the switched connection, a preferred solution is to include only the ID of the current switched connection in the message of reverse migrating request. Usually, the ID of a switched connection contains the IDs of the starting and ending nodes of the switched connection, ID of session, ID of the connection group and ID of exemplary connections, by means of which each node of the current switched connection can find the corresponding routing information locally and send out the message of reverse migrating request.

Obviously, a list of routing records can also be contained in the message of reverse migrating request as in the message of connection migrating request. That is, if the current switched connection A-B-E-F to be migrated starts from the incoming port or incoming channel of the ingress node A and ends at the outgoing port or outgoing channel of the egress node F, the list of routing records in the message of connection migrating request should include at least: ID of the ingress node and the incoming port information thereof; if the current switched connection A-B-E-F to be migrated starts from the ingress node A and ends at the egress node F, the list of routing records in the message of connection migrating request should include at least: ID of the ingress node and the outgoing port information thereof. The incoming port information mentioned here comprises ID of the incoming port of the node and should further comprise ID of the incoming channel of the incoming port if the switched connection to be migrated comprises a channel of the port; the outgoing port information comprises ID of the outgoing port and should further comprise ID of the channel of the outgoing port if the switched connection to be migrated comprises a channel of the port. In this embodiment, identifier of each network device is represented by ID of the network device. In addition, said list may further comprise: the direction of the current connection, i.e. bi-directional or uni-directional, the load type of the connection, and so on. Furthermore, in order to make it convenient for the egress node to verify the message of connection migrating request at the subsequent Step 305, ID of the egress node may be added to the message of request; and if the switched connection to be migrated starts from the incoming port or incoming channel of the ingress node A and ends at the outgoing port or outgoing channel of the egress node F, the outgoing port information of the egress node should be included in the message as well.

Step 302: The ingress node A, after receiving from its incoming port the message of reverse migrating request at Step 301, identifies the connection as in a state of being deleted from the control plane but does not delete the cross-connections, and if the ID of the current switched connection is contained in the message of reverse migrating request, finds the corresponding routing information to the next node B locally according to the ID to send out the message of reverse migrating request.

If the message of reverse migrating request contains the incoming port ID of the ingress node and the incoming port information of the ingress node, obtain the outgoing port information at node A of the current switched connection requested to be migrated through the above information together with the cross-connection information stored in A's own table of cross-connection, and add the outgoing port information to the message of reverse migrating request; if the message of reverse migrating request contains outgoing port information, add the outgoing port information directly to the list of routing records of the message of reverse migrating request. Then obtain the ID of the next node, i.e. node B according to the connection relationship of links stored in the control plane for adjacent link management and maintenance, i.e. the "network map", and send the message of reverse migrating request to node B via the IP-based control channel.

In addition, it is also possible to verify the information in the message beforehand after node A receives the message of connection migrating request, which specifically comprises: checking whether the node ID of the incoming port included in the signaling exists or not, and checking whether the incoming port information exists and whether there exists the switched connection on the channel if the message includes incoming port information; if the checking results are positive, go to the follow-up sub-steps in Step 302, otherwise return a message of error to the initiator of the migrating request and end the process. In this way, interference of fault messages can be avoided.

Step 303: Node B, after receiving the message of reverse migrating request sent from node A, marks the connection as in a state of being deleted from the control plane but does not delete the cross-connections, and if the identifier of the current switched connection is contained in the message of reverse migrating request, finds the corresponding routing information to the next node E locally according to the identifier and sends out the message of reverse migrating request.

If a routing list is contained in the message of reverse migrating request, the outgoing port information of node A can be obtained. Then based on the connection relationship of links stored in its own table of cross-connection for management and maintenance, relevant incoming port information at node B of the switched connection to be migrated can be obtained. Thereafter, go through the similar steps as with node A, that is, find the outgoing port information by means of the incoming port information and add the outgoing port information to the end of the list of routing records in the message of migrating request, then obtain the ID of the next node E according to the "network map" and send the message of reverse migrating request to node E via the control channel.

Step 304: Node E, after receiving the message of reverse migrating request sent from node B, performs the same operation as node B and forwards the message of reverse migrating request to the egress node F.

Step 305: After receiving the message of reverse migrating request sent from node E, node F deletes the state of the switched connection in the control plane but does not delete the cross-connections of the connection, hands over the resources occupied by the connection to the management plane, and generates a message of migration completing notification. If the identifier of the current switched connection is contained in the message of reverse migrating request, the identifier is extracted and put in the message of migration completing notification. The message of migration completing notification is transferred in the reversed direction of the path of forwarding the message of migrating request, i.e. sent in the path of F-E-B-A.

If the message of reverse migrating request contains the routing list, all the information of the list of routing records in the message of migrating request is kept in the message of migration completing notification while ID of this node is added thereto. If the message of connection migrating request includes the incoming port information of the ingress node, then the outgoing port information of the egress node, i.e. ID of the outgoing port or ID of the outgoing channel, should be added to the message of migration completing notification. In this way, the complete routing of links of the migrated connection is included in the message of migration completing notification. Then the message of migration completing notification is transferred in the reversed direction of the transferring path of the message of connection migrating request, i.e. transferred along the path of F-E-B-A.

Preferably in this step, after node F receives the message of reverse migrating request sent from E, further verify whether the information contained in this message is correct or not, which specifically comprises: making analysis of the ID of the egress node contained in the message, and meanwhile making analysis of the outgoing port information if the outgoing port information of the egress node is also contained in the message, comparing said information with the ID and outgoing port information of this node to determine whether they are consistent. If consistent, accept the reverse migrating request and continue with the follow-up sub-steps of Step 305, otherwise return a message of failure along the path of F-E-B-A to the initiator with the cause of failure and end the process. In performing this step, the outgoing port information of node F itself, i.e. ID of the outgoing port or ID of the outgoing channel at node F, may be obtained in a similar way as in the processing with nodes B and E.

Step 306: Node E, after receiving the message of migration completing notification forwarded by node F, similarly as node F, deletes the information of the switched connection in the control plane but does not delete the cross-connections thereof, hands over the resources occupied by the connection to the management plane, and then forwards the message of migration completing notification to node B.

Step 307: After receiving the message of reverse migration completing notification forwarded by node E, node B deletes the switched connection in the same way as node E before forwarding the message of migration completing notification to node A.

Step 308: After receiving the message of migration completing notification forwarded by node B, node A deletes the switched connection in the same way as node E and node B but does not delete the cross-connections of the connection, and hands over the resources occupied by the connection to the management plane. If the reverse migration succeeds, node A will forward the message of migration completing notification to the initiator of the request. By this time, the switched connection A-B-E-F has been migrated to a permanent connection and the control plane no longer manages the resources occupied by the connection. If the migration fails, a message of failure is returned to the initiator of the request and the process is over.

As in the process of migrating a permanent connection to a switched connection, the message of reverse migrating request in this embodiment is forwarded node by node successively in the downstream direction of the switched connection to be migrated, i.e. in the run of traffic signals of the connection while the deletion of the switched connection is carried out node by node from the egress node in the upstream direction. For a bi-directional connection, any direction of the traffic signal run can be selected for making the migration.

In the preferred embodiments described above, migrations between a permanent connection and a switched connection in an optical network are carried out node by node successively starting from the egress node until the ingress node in the reversed direction of the forwarding path of the message of connection migrating request after said message of connection migrating request has arrived at the egress node. On the other hand, a process of migration between a permanent connection and a switched connection according to this invention can also proceed along the path of the message of connection migrating request, i.e. A-B-E-F, which comprises specifically: making the migration between a permanent connection and a switched connection right after each node receives the message of connection migrating request, forwarding the message of connection migrating request to the next node to be migrated after the node has completed the connection migration, and sending a message of migration completing notification in the upstream direction, i.e. the direction of F-E-B-A in the optical network of FIG. 1, up to the initiator of the migration request after the last node, or the egress node has completed the migration, wherein the contents of the message of connection migrating request and the message of migration completing notification as well as the processing of the message by the nodes are completely the same as in the above-said embodiments.

In the above solution, if the message of connection migrating request sent out by the initiator includes the entire or part of the routing of the links to be migrated, a node can make analysis of the routing contained in the message of request after said message has arrived at the node, and judge whether the routing contained in the message regarding the next node is consistent with the routing regarding the next node found automatically in its own cross-connection table of the node and the "network map". If consistent, continue with the operation of the follow-up steps, otherwise return to the initiator of the migration request a message of error containing the identifier of the node where the error is detected, and end the process.

It should be understood that the foregoing description presents preferred embodiments of this invention rather than limits thereto. Any modification, equivalent substitution, or improvement without departing from the spirit and principle of this invention should be covered in the protection scope of this invention.

The invention claimed is:

1. A method for migration between a permanent connection and a switched connection in a transmission network, the method comprising:

a) after receiving a first message of connection migrating request, sending, by an ingress node of a current connection, a second message of the connection migrating request node by node in a direction of traffic signal transmission of the current connection starting from the ingress node until an egress node of the current connection; and b) making migration between the permanent connection and the switched connection node by node after receiving the second message of the connection migrating request, wherein the step of sending the second message of the connection migrating request and the step of making the migration are performed by a control plane of a node and the second message of the connection migrating request is transferred via a plurality of control links, and wherein a migration from the permanent connection to the switched connection in the step of making the migration between the permanent connection and the switched connection comprises: creating a state of the switched connection on the control plane of the node and handing over cross-connections of the permanent connection at node to the control plane.

2. The method according to claim 1, wherein the control plane is based on Transmission Control Protocol (TCP)/Internet Protocol (IP), and the step of making the migration between the permanent connection and the switched connection is implemented by using Resource Reservation Protocol-Traffic Engineering (RSVP-TE) signaling protocol or Constraint-based Routing Label Distribution Protocol (CR-LDP) signaling protocol.

3. The method according to claim 1, wherein the migration between the permanent connection and the switched connection node by node in the step b) comprises:

making the migration between the permanent connection and the switched connection node by node starting from the egress node until the ingress node in a reversed direction of a sending path of the second message of the connection migrating request after the second message of the connection migrating request reaches the egress node.

4. The method according to claim 3, further comprising:

each node, after completing the migration, sending a message of migration completing notification to a next node required to make the migration until the ingress node, which sends the message of the migration completing notification to an initiator of the connection migrating request.

5. The method according to claim 4, wherein the message of the migration completing notification comprises routing information of an entire connecting link of the migration.

6. The method according to claim 1, wherein the migration between the permanent connection and the switched connection node by node in the step b) comprises:

making the migration between the permanent connection and the switched connection by the ingress node after receiving the first message of the connection migrating request; and making the migration between the permanent connection and the switched connection by each of the other nodes after receiving the second message of the connection migrating request.

7. The method according to claim 6, further comprising:
after all nodes complete the migration, forwarding the message of the migration completing notification node by node starting from the egress node till the ingress node in the reversed direction of the sending path of the second message of the connection migrating request, and the ingress node sending the message of the migration completing notification to an initiator of the connection migrating request.

8. The method according to claim 1, wherein the first message of the connection migrating request received by the ingress node comprises:
an ingress node identifier and incoming port information of the ingress node of the connection currently requested to be migrated, or the ingress node identifier and outgoing port information of the ingress node of the connection currently requested to be migrated, and each node adds its own outgoing port information to the second message of the connection migrating request before sending the second message.

9. The method according to claim 8, wherein in the step of sending the second message of the connection migrating request by each node, the outgoing port information from a present node to a next node is added to the second message of the connection migrating request if the second message includes the incoming port information; and
wherein the incoming port information from the present node to the next node is added to the second message of the connection migrating request if the second message includes the outgoing port information.

10. The method according to claim 8, wherein the incoming port information comprises an identifier of the incoming port, or an identifier of the incoming channel, or the combination thereof; and
wherein the outgoing port information comprises an identifier of the outgoing port, or an identifier of the outgoing channel, or the combination thereof.

11. The method according to claim 8, wherein the outgoing port information of the node is obtained by inquiring cross-connection information stored in the node itself based on the incoming port information of the current node.

12. The method according to claim 8, further comprising before the ingress node makes the migration between the permanent connection and the switched connection:
deciding whether the ingress node identifier and incoming port information or the ingress node identifier and outgoing port information contained in the received first message of the connection migrating request is correct or not, if yes, making the migration, otherwise returning a message of failure.

13. The method according to claim 8, wherein the first message of the connection migrating request received by the ingress node further comprises:
an egress node identifier, or the egress node identifier and outgoing port information at the egress node of the current connection requested to be migrated.

14. The method according to claim 13, further comprising before the egress node makes the migration between the permanent connection and the switched connection:
deciding whether the egress node identifier or the egress node identifier and outgoing port information contained in the received second message of the connection migrating request is correct or not, if yes, creating or deleting the switched connection at the node, otherwise returning a message of failure.

15. The method according to claim 1, wherein the connection is a uni-directional connection or a bi-directional connection.

16. The method according to claim 1, wherein the switched connection is a soft permanent connection initiated by a network management system or a switched connection initiated by a client device or a proxy thereof.

17. The method according to claim 1, wherein the transmission network is a Synchronous Digital Hierarchy, or a synchronous optical network, or a wavelength switched network, or an Optical Transport Network (OTN).

18. The method according to claim 1, wherein if the first message of the connection migrating request is sent from a network management system, the first message of the connection migrating request is a command; if the first message of the connection migrating request is sent from a client device, the first message of the connection migrating request is a signaling; and
wherein the second message of the connection migrating request is a signaling.

19. A method for migration between a permanent connection and a switched connection in a transmission network, the method comprising:
a) after receiving a first message of connection migrating request, sending, by an ingress node of a current connection, a second message of the connection migrating request node by node in a direction of traffic signal transmission of the current connection starting from the ingress node until an egress node of the current connection; and
b) making migration between the permanent connection and the switched connection node by node after receiving the second message of the connection migrating request,
wherein the step of sending the second message of the connection migrating request and the step of making the migration are performed by a control plane of a node and the second message of the connection migrating request is transferred via a plurality of control links, and
wherein a migration from the switched connection to the permanent connection in the step of making the migration between the permanent connection and the switched connection comprises: deleting a state of the switched connection from the control plane of the node and handing over cross-connections of the switched connection at the node to a management plane.

20. The method according to claim 19, wherein if the migration between the permanent connection and the switched connection is a migration from the switched connection to the permanent connection, the first message of the connection migrating request received by the ingress node comprises:
an identifier of a current switched connection.

21. The method according to claim 19, wherein the control plane is based on TCP/IP protocol, and the step of making the migration between the permanent connection and the switched connection is implemented by using RSVP-TE signaling protocol or CR-LDP signaling protocol.

22. The method according to claim 19, wherein the migration between the permanent connection and the switched connection node by node in the step b) comprises:
making the migration between the permanent connection and the switched connection node by node starting from the egress node until the ingress node in a reversed direction of a sending path of the second message of the connection migrating request after the second message of the connection migrating request reaches the egress node.

23. The method according to claim 22, further comprising:
each node, after completing the migration, sending a message of migration completing notification to a next node required to make the migration until the ingress node, which sends the message of the migration completing notification to an initiator of the connection migrating request.

24. The method according to claim 23, wherein the message of the migration completing notification comprises routing information of an entire connecting link of the migration.

25. The method according to claim 23, wherein the message of the migration completing notification comprises an identifier of a current switched connection if the migration between the permanent connection and the switched connection is the migration from the switched connection to the permanent connection.

26. The method according to claim 19, wherein the migration between the permanent connection and the switched connection node by node in the step b) comprises:
making the migration between the permanent connection and the switched connection by the ingress node after receiving the first message of the connection migrating request;
making the migration between the permanent connection and the switched connection by each of the other nodes after receiving the second message of the connection migrating request.

27. The method according to claim 26, further comprising:
after all nodes complete the migration, forwarding the message of the migration completing notification node by node starting from the egress node till the ingress node in the reversed direction of the sending path of the second message of the connection migrating request, and the ingress node sending the message of the migration completing notification to an initiator of the connection migrating request.

28. The method according to claim 19, wherein the first message of the connection migrating request received by the ingress node comprises:
an ingress node identifier and incoming port information of the ingress node of the connection currently requested to be migrated, or the ingress node identifier and outgoing port information of the ingress node of the connection currently requested to be migrated, and each node adds its own outgoing port information to the second message of the connection migrating request before sending the second message.

29. The method according to claim 28, wherein in the step of sending the second message of the connection migrating request by each node, the outgoing port information from a present node to a next node is added to the second message of the connection migrating request if the second message includes the incoming port information; and
wherein the incoming port information from the present node to the next node is added to the second message of the connection migrating request if the second message includes the outgoing port information.

30. The method according to claim 28, wherein the incoming port information comprises an identifier of the incoming port, or an identifier of the incoming channel, or the combination thereof; and
wherein the outgoing port information comprises an identifier of the outgoing port, or an identifier of the outgoing channel, or the combination thereof.

31. The method according to claim 28, wherein the outgoing port information of the node is obtained by inquiring cross-connection information stored in the node itself based on the incoming port information of the current node.

32. The method according to claim 28, further comprising before the ingress node makes the migration between the permanent connection and the switched connection:
deciding whether the ingress node identifier and incoming port information or the ingress node identifier and outgoing port information contained in the received first message of the connection migrating request is correct or not, if yes, making the migration, otherwise returning a message of failure.

33. The method according to claim 28, wherein the first message of the connection migrating request received by the ingress node further comprises:
an egress node identifier, or the egress node identifier and outgoing port information at the egress node of the current connection requested to be migrated.

34. The method according to claim 33, further comprising before the egress node makes the migration between the permanent connection and the switched connection:
deciding whether the egress node identifier or the egress node identifier and outgoing port information contained in the received second message of the connection migrating request is correct or not, if yes, creating or deleting the switched connection at the node, otherwise returning a message of failure.

* * * * *

UNITED STATES PATENT AND TRADEMARK OFFICE
CERTIFICATE OF CORRECTION

PATENT NO. : 8,068,483 B2
APPLICATION NO. : 10/566602
DATED : November 29, 2011
INVENTOR(S) : Yongliang Xu It is certified that error appears in the above-identified patent and that said Letters Patent is hereby corrected as shown below:

On the front page of the patent item (30) the publication number in the Foreign Application Priority Data section should be 03149955.4

Signed and Sealed this
Seventeenth Day of April, 2012

David J. Kappos
*Director of the United States Patent and Trademark Office*